March 24, 1931.    A. CERNUDA    1,798,011
AUTOMOBILE BUS
Filed April 22, 1929    3 Sheets-Sheet 3
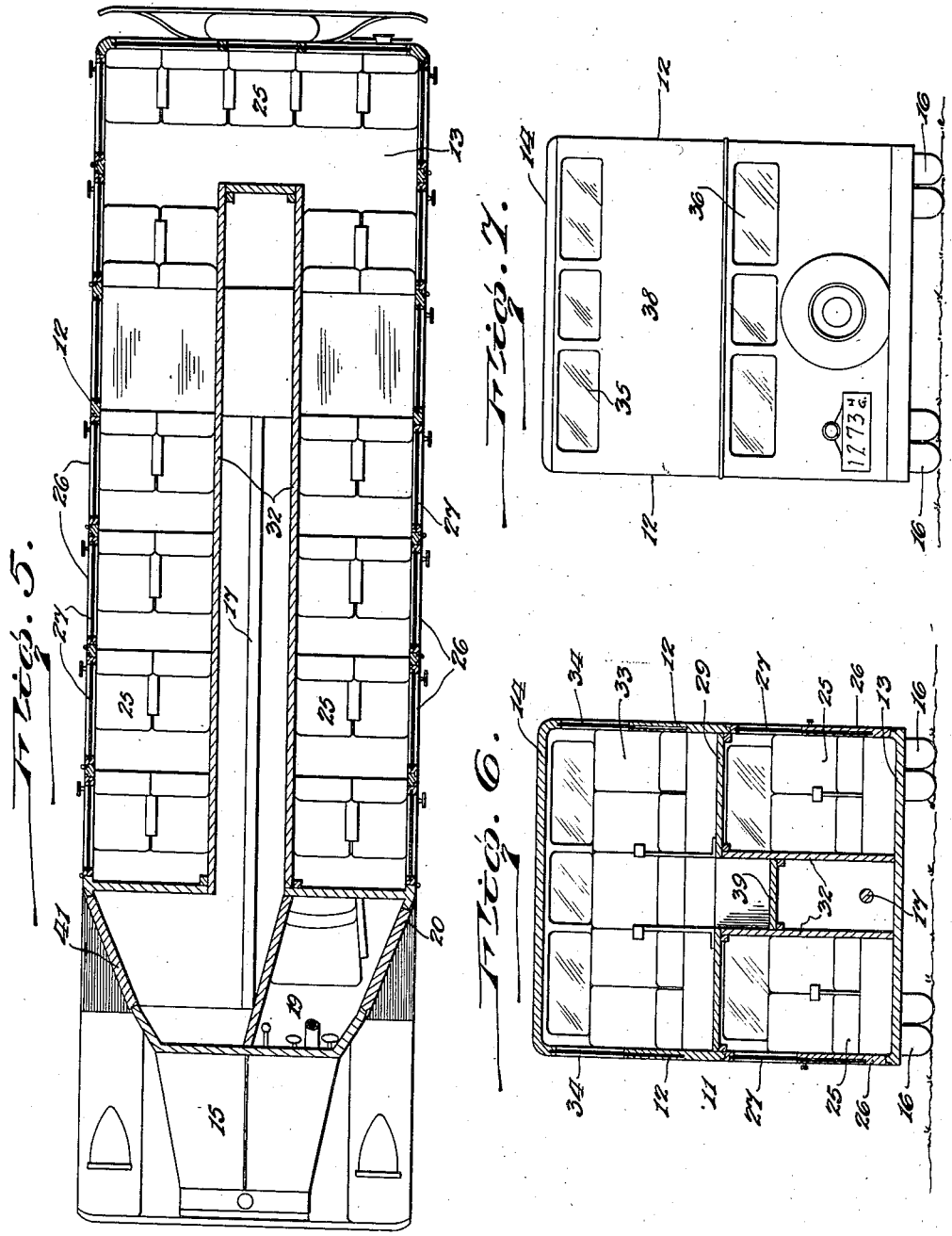
ANTONIO CERNUDA
INVENTOR
BY Victor J. Evans
ATTORNEY
WITNESS:

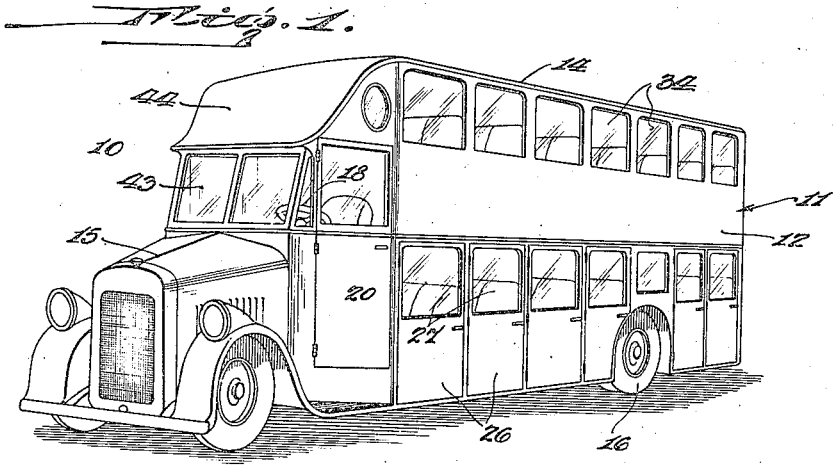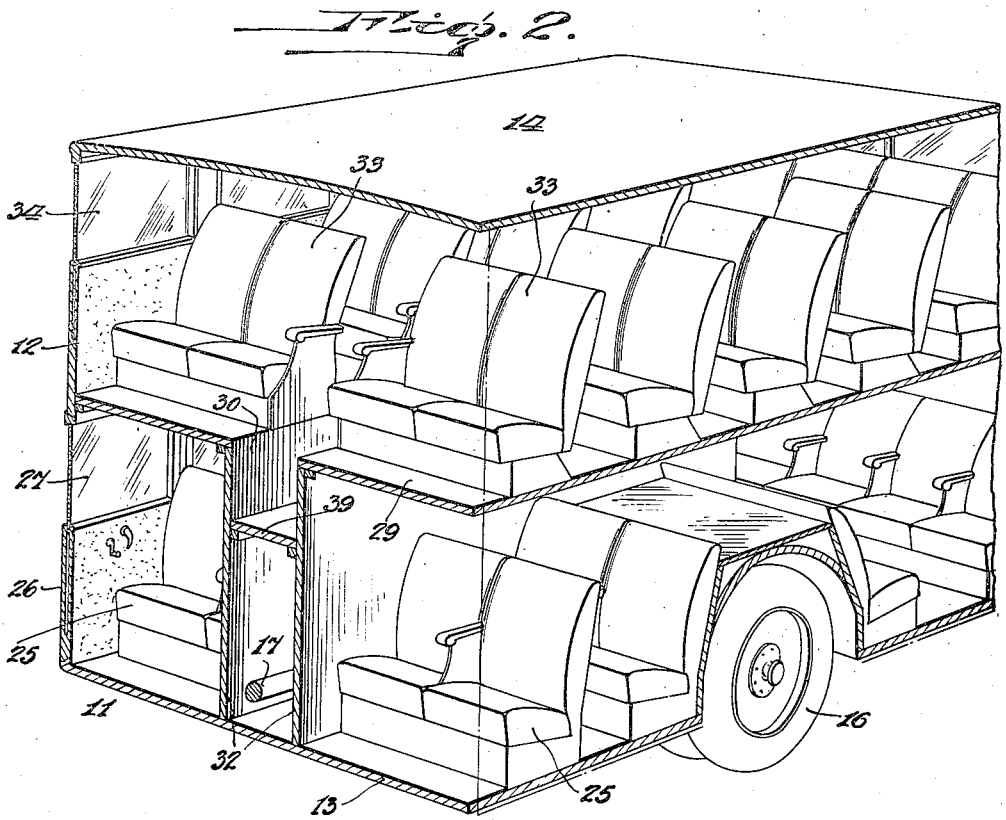

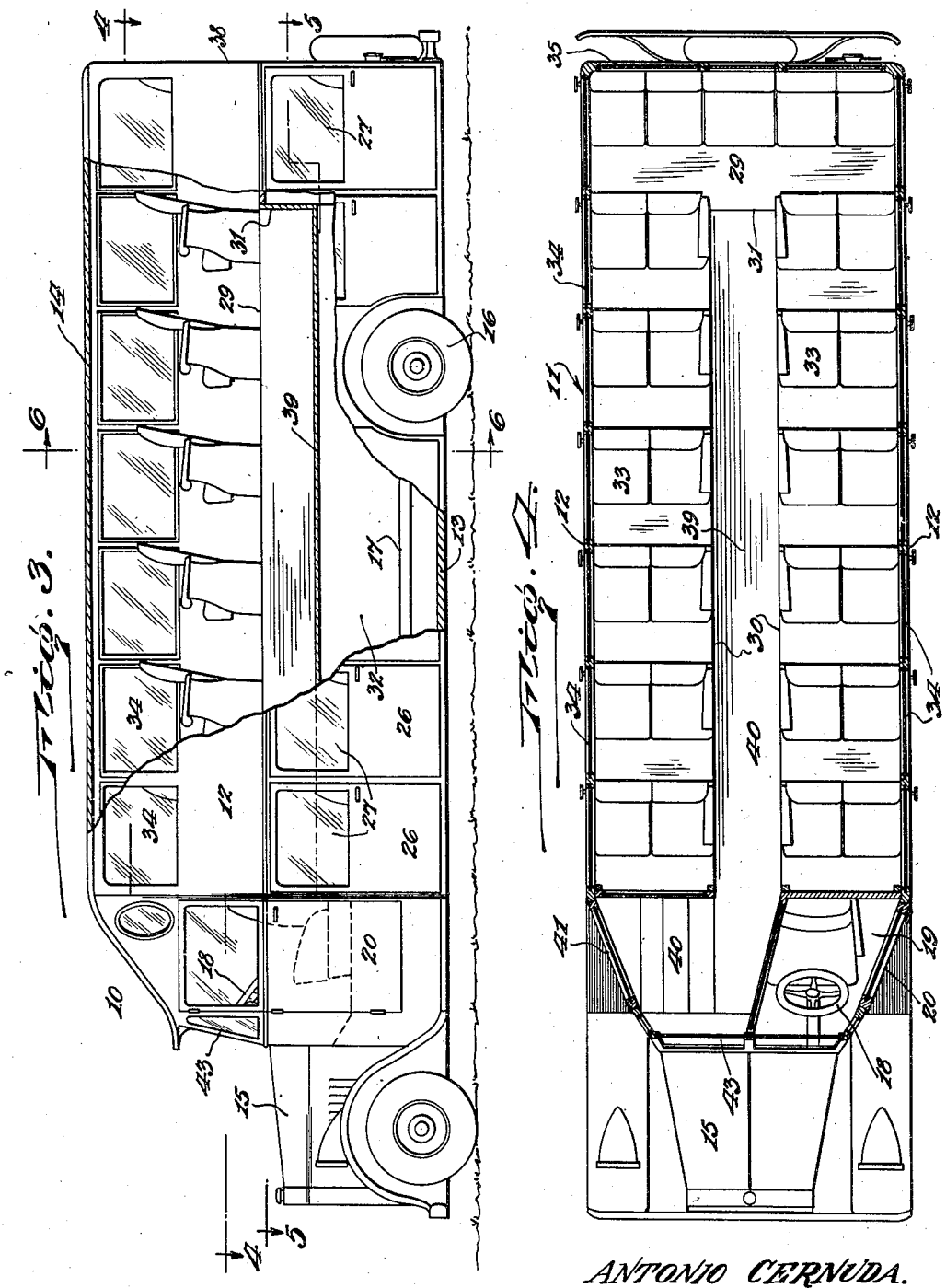

Patented Mar. 24, 1931

1,798,011

UNITED STATES PATENT OFFICE

ANTONIO CERNUDA, OF MONROE, NEW YORK

AUTOMOBILE BUS

Application filed April 22, 1929. Serial No. 357,198.

This invention relates to improvements in automobile busses in which a plurality of decks or floors are provided for passenger carrying purposes.

The primary object of the invention is to increase the inner carrying capacity of auto busses without materially enlarging the external dimensions thereof, since it will be appreciated that while very large busses have been constructed, in an endeavor to meet growing demands, the seating accommodation of these vehicles has been limited.

As it is necessary that the exterior dimensions of busses be such as to enable the same to be housed in ordinary garages, when not in use, and to negotiate bridges and underpasses with restricted headway on intercity and other highways, another important object of the invention is to position a pair of passenger carrying decks within a bus of about ordinary height.

A further object of the invention is the provision of seating means in a vehicle in which passengers using the same in a sitting position may be accommodated in a standing position within the vehicle adjacent the seats before entering and after leaving the latter.

A still further object of the invention is to provide a bus with a top tier of seats which may be entered by passengers standing in an aisle adjacent the seats, and with a lower tier of seats adjacent which standing facilities are available on the usual ground surface outside of the bus for passengers entering or leaving the same.

With these and other objects in view, the invention resides in certain novel construction and combination and arrangement of parts, the essential features of which are hereinafter fully described, are particularly pointed out in the appended claim, and are illustrated in the accompanying drawing, in which:—

Figure 1 is a perspective view of my improved auto bus.

Figure 2 is a fragmentary sectional perspective view showing the arrangement of the seating means and internal construction.

Figure 3 is a side elevational view, partly broken away and in section.

Figure 4 is a longitudinal horizontal sectional view on the line 4—4 of Figure 3.

Figure 5 is a longitudinal horizontal sectional view on the line 5—5 of Figure 3.

Figure 6 is a transverse vertical section taken on the line 6—6 of Figure 3.

Figure 7 is a rear elevational view.

Referring particularly to the drawings by reference characters, the numeral 10 designates my improved bus in its entirety, which includes a body 11 having parallel side walls 12, a base floor or deck 13, and a top wall or roof 14. The forward part 15 of the body contains a motor which delivers power to the rear or drive wheels 16 by a drive shaft 17, while the control means, including a steering wheel 18, are located in the driver's compartment 19, which is provided with a door 20.

The deck 13 carries thereon double seats 25 which, in the preferred embodiment of the invention, are arranged in longitudinal and transverse rows, each outer seat of the latter rows having adjacent the same an entrance door 26, in which is slidably mounted a panel of glass or other transparency 27. In order to minimize the total height of the bus, this deck 13 is disposed on a plane below the axis of the wheels, which also gives the body a low center of gravity to increase its stability. A baggage space 28 is provided on said deck between the two rearmost transverse rows of seats 25, this space being reached, as is the row of seats therebehind, by way of either of the rearmost side doors 26.

Approximately supported at its outer edges, intermediate the top 14 and floor 13, I provide an upper deck 29, the inner edges 30 of which, spaced apart forward of the rear edge 31, are supported by spaced vertical walls 32, which rise from said floor 13. This upper deck also carries rows of double seats 33, which may be like the seats 25 of the lower deck, while each transverse row has at each end thereof a window 34. Top and lower windows or the like 35 and 36 are also provided in the end wall 38. Supported between the walls 32, below the plane of the deck 29, is a floor 39 which, connecting with steps 40 adjacent the front door 41, renders the seats 33 accessible from the street level. It will be noted that, while the vertical space between the lower and upper decks 13, 29 and that between the latter deck and the top 14 are sufficient for sitting room only, the aisle between the transverse rows of seats 33 and above the auxiliary deck 39, affords normal walking space for passengers using said seats, or for conductors or other bus officials. The seating means 25 are of course directly accessible from the ground or highway.

With an overall bus height of about ten and a half feet there is ample sitting room for persons using the tiers of seats 33 and 25 in the top and lower compartments between the respective main decks and top wall 14, while there is at the same time sufficient space above the auxiliary deck for walking purposes; and as the minimum clearance beneath bridges or the like is generally about twelve feet, it follows that this compact and improved vehicle with increased carrying capacity may safely travel, even at high speed, when passing such bridges or obstructions.

The front transarent structure 43, which is inclined rearwardly at the top, affords good visibility, the top front part 44 of the roof 14, as well as the doors 20, 41 and front part 15 of the body are also favorably inclined or streamlined to reduce head resistance, when travelling at a high rate of speed, and to give the bus an attractive appearance.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claim.

What is claimed as new is:—

In a bus body, the combination of outer side walls, a roof wall, a main floor wall, a rear wall, a plane intermediate floor wall at a level substantially half way between said roof and floor walls, said intermediate floor wall being substantially U-shaped in plan and having a rear subdivision extending all the way across the body and side subdivisions each extending to a point near the front of the body, said subdivision extending laterally inwardly of the body from said outer walls to have their inner edges spaced substantially equally on opposite sides of the longitudinal center line of the body, auxiliary intermediate side and end walls combining with said side walls, said main floor wall and said rear wall to establish a U-shaped lower passenger seating compartment in the space below said U-shaped floor, seats in said compartment arranged in rows transverse to the body, individually openable doors in the outer side walls opposite each of said seats whereby access to any of said seats may be had only from the exterior of the body by way of the appropriate door, a forward continuation of the body including a driver's seat occupying only a part of the width of the body, ascending steps in said forward continuation alongside said driver's seat, said forward continuation having openings at opposite sides thereof (one for giving access from the exterior of the body to said driver's seat and the other for giving access from the exterior of the body to said steps, a second intermediate plane floor wall at a level between the main floor wall and the first-mentioned intermediate floor wall and extending within the space between said intermediate side walls and from said steps to said intermediate end wall, and seats on the first-mentioned intermediate floor wall to constitute the space above the last mentioned wall a second U-shaped passenger seating compartment, aforesaid main floor, roof and intermediate floor walls being arranged at such vertical spacings that each of said passenger seating compartments is of insufficient height to permit an adult passenger to stand upright therein.

In testimony whereof, I hereby affix my signature.

ANTONIO CERNUDA.